(12) United States Patent
Chen

(10) Patent No.: US 11,970,094 B2
(45) Date of Patent: Apr. 30, 2024

(54) SAFETY SEAT AND BASE THEREOF

(71) Applicant: BAMBINO PREZIOSO SWITZERLAND AG, Steinhausen (CH)

(72) Inventor: Yingzhong Chen, Dongguan (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 7 days.

(21) Appl. No.: 17/583,853

(22) Filed: Jan. 25, 2022

(65) Prior Publication Data
US 2022/0234480 A1    Jul. 28, 2022

(30) Foreign Application Priority Data
Jan. 26, 2021   (CN) .......................... 202110104241.0

(51) Int. Cl.
*B60N 2/28*   (2006.01)

(52) U.S. Cl.
CPC .......... *B60N 2/2821* (2013.01); *B60N 2/2824* (2013.01); *B60N 2/2827* (2013.01); *B60N 2/286* (2013.01); *B60N 2/289* (2013.01); *B60N 2/2893* (2013.01)

(58) Field of Classification Search
CPC .. B60N 2/2821; B60N 2/2824; B60N 2/2827; B60N 2/289; B60N 2/2893; B60N 2/286
See application file for complete search history.

(56) References Cited

U.S. PATENT DOCUMENTS

| 7,073,859 | B1 | 7/2006 | Wilson |
| 10,272,804 | B2 | 4/2019 | Williams |
| 10,442,324 | B2 | 10/2019 | Pacella |
| 11,447,047 | B2 * | 9/2022 | Mason ..................... B60N 2/62 |
| 2006/0273640 | A1 | 12/2006 | Kassai |
| 2010/0225150 | A1 | 9/2010 | Duncan |
| 2018/0264977 | A1 | 9/2018 | Anderson et al. |
| 2022/0009386 | A1 * | 1/2022 | Cui ...................... B60N 2/2863 |

FOREIGN PATENT DOCUMENTS

| AU | 4656279 A1 | 11/1979 |
| CN | 101670797 A | 3/2010 |
| CN | 102785598 A | 11/2012 |
| CN | 102897062 A | 1/2013 |
| CN | 205706275 U | 11/2016 |
| CN | 107199921 A | 9/2017 |

(Continued)

OTHER PUBLICATIONS

Office Action issued in corresponding Taiwanese Patent Application No. 11121177540 dated Nov. 29, 2022, consisting of 23 pp. (English Translation Provided).

(Continued)

*Primary Examiner* — Syed A Islam
(74) *Attorney, Agent, or Firm* — Volpe Koenig

(57) ABSTRACT

The present disclosure provides a base for a safety seat, which includes a base body and a support mechanism mounted with the base body for supporting the seat on a vehicle seat. The support mechanism includes a support member extending out of the base body and movable back and forth with respect to the base body, and an adjustment assembly configured to adjust a position of the support member with respect to the base body.

18 Claims, 12 Drawing Sheets

(56) References Cited

FOREIGN PATENT DOCUMENTS

| | | | | |
|---|---|---|---|---|
| CN | 107199923 | A | | 9/2017 |
| CN | 107199924 | A | | 9/2017 |
| CN | 108237956 | A | | 7/2018 |
| CN | 109278597 | A | | 1/2019 |
| CN | 109305073 | A | | 2/2019 |
| CN | 109318763 | A | | 2/2019 |
| CN | 209096540 | U | | 7/2019 |
| CN | 110562103 | A | | 12/2019 |
| CN | 110573374 | A | | 12/2019 |
| CN | 111251955 | A | | 6/2020 |
| CN | 111483362 | A | | 8/2020 |
| CN | 113978324 | A | * | 1/2022 ........... B60N 2/2821 |
| DE | 20201303196 | U1 | | 10/2013 |
| EP | 1671839 | A1 | | 6/2006 |
| EP | 2022663 | A2 | | 2/2009 |
| EP | 3600955 | B1 | | 6/2021 |
| GB | 2202433 | A | | 9/1988 |
| GB | 2523461 | A | | 8/2015 |
| GB | 2573595 | A | | 11/2019 |
| KR | 101570000 | B1 | | 11/2015 |
| KR | 20180029767 | A | | 3/2018 |
| TW | M535661 | U | | 1/2017 |
| WO | 2019051973 | A1 | | 3/2019 |

OTHER PUBLICATIONS

Office Action issued in counterpart Australian Patent Application No. 2022200460 dated Jun. 1, 2023.
Office Action issued in counterpart German Patent Application No. 10 2022 101 759.1 dated May 10, 2023.
Office Action issued in corresponding Taiwanese Patent Application No. 111103174 dated Nov. 29, 2022, consisting of 23 pp. (English Translation Provided).
Notice of Acceptance issued in corresponding Application No. 2022200460 dated Dec. 4, 2023.
Notice of Allowance issued in corresponding Chinese Application No. 202110104241.0 dated Jan. 6, 2024. English translation included.
Office Action issued in corresponding Chinese Application No. 202110104241.0 dated Nov. 22, 2023. English translation included.

* cited by examiner

SAFETY SEAT AND BASE THEREOF

CROSS REFERENCE TO RELATED APPLICATIONS

This application claims the priority of Chinese Patent Application No. 202110104241.0, filed Jan. 26, 2021, the content of which is hereby incorporated by reference in its entirety.

TECHNICAL FIELD

The present disclosure relates to a safety seat and a bases for the safety seat.

BACKGROUND

Safety seats, such as child safety seats, are mounted on the vehicle seats for carrying children to improve the safety of children in the vehicles. The safety seat ensures the safety of children in vehicles by reducing physical impact on children and limiting their body movement in the case of an emergency, such as a collision or rapid deceleration. The safety seat can be fixed to the vehicle seat, however, existing safety seats are not adjustable in position on the vehicle seats or are not stable enough when adjusted. In addition, the movement of children may loosen the seat belt that fastens the safety seats, which may cause the safety seats to move, bringing a risk to children in the vehicles.

SUMMARY

The present disclosure provides a base for a safety seat, which includes a base body and a support mechanism mounted with the base body for supporting the seat on a vehicle seat. The support mechanism includes a support member extending out of the base body and movable back and forth with respect to the base body, and an adjustment assembly configured to adjust a position of the support member with respect to the base body.

The present disclosure also provides a safety seat, which includes a base and a seat body supported on the base. The base includes a base body and a support mechanism mounted with the base body for supporting the seat on a vehicle seat. The support mechanism includes a support member extending out of the base body and movable back and forth with respect to the base body, and an adjustment assembly configured to adjust a position of the support member with respect to the base body.

The details of one or more embodiments of the present invention are set forth in the following drawings and description. Other features, objects and advantages of the present invention will become apparent from the description, drawings and claims.

BRIEF DESCRIPTION OF THE DRAWINGS

To illustrate the technical solutions of the embodiments of the present disclosure, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION

Figure 1:
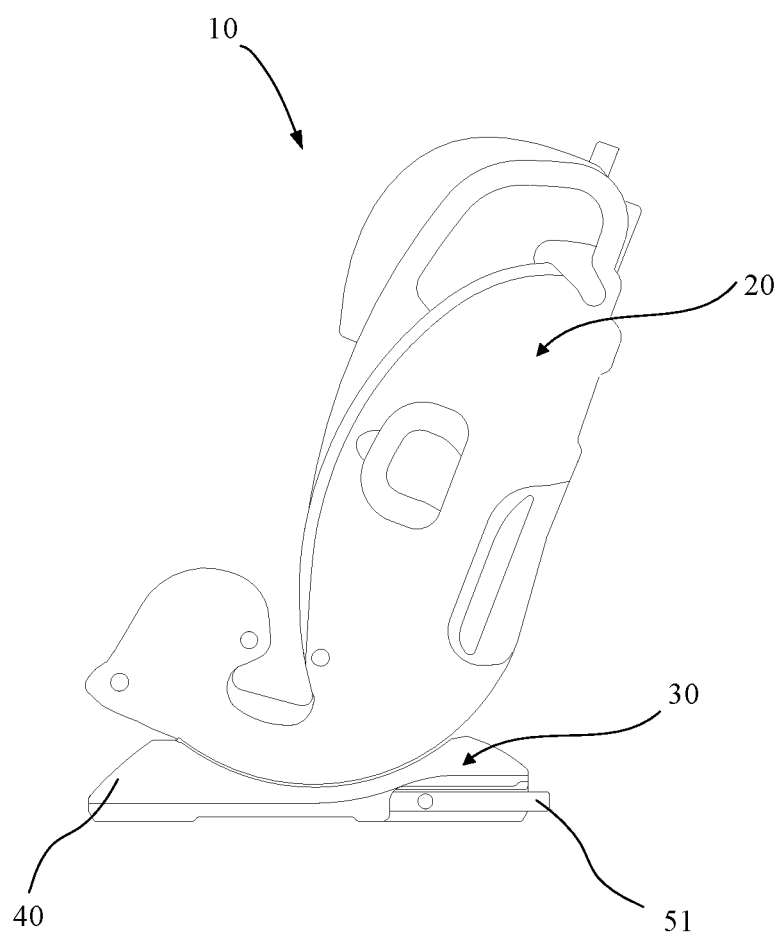
FIG. 1 is a side view of a safety seat of an embodiment of the present disclosure.

Implementation of the present disclosure are elaborated below with reference to the accompanying drawings, to enable the objectives, advantages and features of the present disclosure more comprehensible. Specific details are described below to enable persons skilled in the art to fully understand the present disclosure. However, the present disclosure may be implemented in other manners besides those described herein. Persons skilled in the art can make such improvements without departing from the concept of the present disclosure. Therefore, the present disclosure is not limited by the embodiments disclosed in the following.

In the description of the present disclosure, it should be understood that terms such as "center", "longitudinal", "transverse", "length", "width", "thickness", "front", "up", "down", "front", "back", "left", "right", "vertical", "horizontal", "top", "bottom", "inside", "clockwise", "counter-clockwise", "axial", "radial", "circumferential" and the like indicate orientation or positional relationships based on the orientation or positional relationships shown in the accompanying drawings, and are intended only to facilitate and simplify the description of the disclosure, not to indicate or imply that the devices or elements must have a particular orientation, be constructed and operate in a particular orientation, and therefore are not to be construed as a limitation of the present disclosure.

In the present disclosure, unless otherwise expressly specified and defined, terms such as "mount", "connect", "interconnect", "secure", "dispose" and other terms shall be understood in a broad way. For example, unless otherwise expressly defined, "connection" may be a fixed connection, detachable connection, or integral connection; it may be a mechanical connection, an electrical connection; it may be direct connection, or indirect connection through an intermedium; and it may be an internal connection of two components or an interaction between two components. For example, when an element is described as "fixed" or "disposed" to another element, it may be directly on the other element or there may be an intermedium element. For those of ordinary skill in the art, the specific meaning of the above terms in the context of the present disclosure can be understood on a case-by-case basis.

In the present disclosure, unless otherwise expressly specified and defined, if a first member is described to be on or under a second member, there may be direct contact between the first and second members, or indirect contact between the first and second members through an intermedium. Besides, if a first member is described to be above a second member, it may mean that the first member is rightly above or diagonally above the second member, or that the first member is horizontally higher above the second member. If a first member is described to be below a second member, it may mean that the first member is right below or diagonally below the second member, or that the first member is horizontally lower than the second member.

According to some embodiments of the present disclosure, one aspect of the present disclosure provides a safety seat which includes a seat body and a base for supporting the seat body. The base includes a base body and a support mechanism mounted with the base body for supporting the safety seat on a vehicle seat. The support mechanism includes a support member extending out of the base body and movable back and forth with respect to the base body and an adjustment assembly configured to adjust a position of the support member with respect to the base body.

According to some embodiments of the present disclosure, another aspect of the present disclosure provides a base for a safety seat. The base includes a base body and a support mechanism mounted with the base body for supporting the safety seat on a vehicle seat. The support mechanism includes a support member extending out of the base body and movable back and forth with respect to the base body and an adjustment assembly configured to adjust a position of the support member with respect to the base body.

The position of the safety seat on the vehicle seat may need to be adjusted during use. For example, when the inclination angle of the seat body of the safety seat is adjusted, the base of the safety seat may need to be moved accordingly on the vehicle seat. Some embodiments of the present disclosure provide an adjustable support member. In the event that the position of the base of the safety seat changes, the support member is adjusted correspondingly to abut against a backrest of the vehicle seat to better support the safety seat on the vehicle seat.

The safety seat of each embodiment of the present disclosure and the base of the safety seat are described in detail below in conjunction with the accompanying drawings of the present disclosure.

According to the embodiment shown in FIGS. 1-7, the safety seat 10 includes a seat body 20 and a base 30 for supporting the seat body 20. The base 30 further includes a base body 40 and a support mechanism 50 mounted with the base body 40. The support mechanism 50 stably supports the safety seat 10 on the vehicle seat. The support mechanism 50 includes a support member 51 and an adjustment assembly 52. The support member 51 extends out of the base body 40, and the adjustment assembly 52 is configured to adjust and secure the position of the support member 51 with respect to the base body 40.

Figure 2:
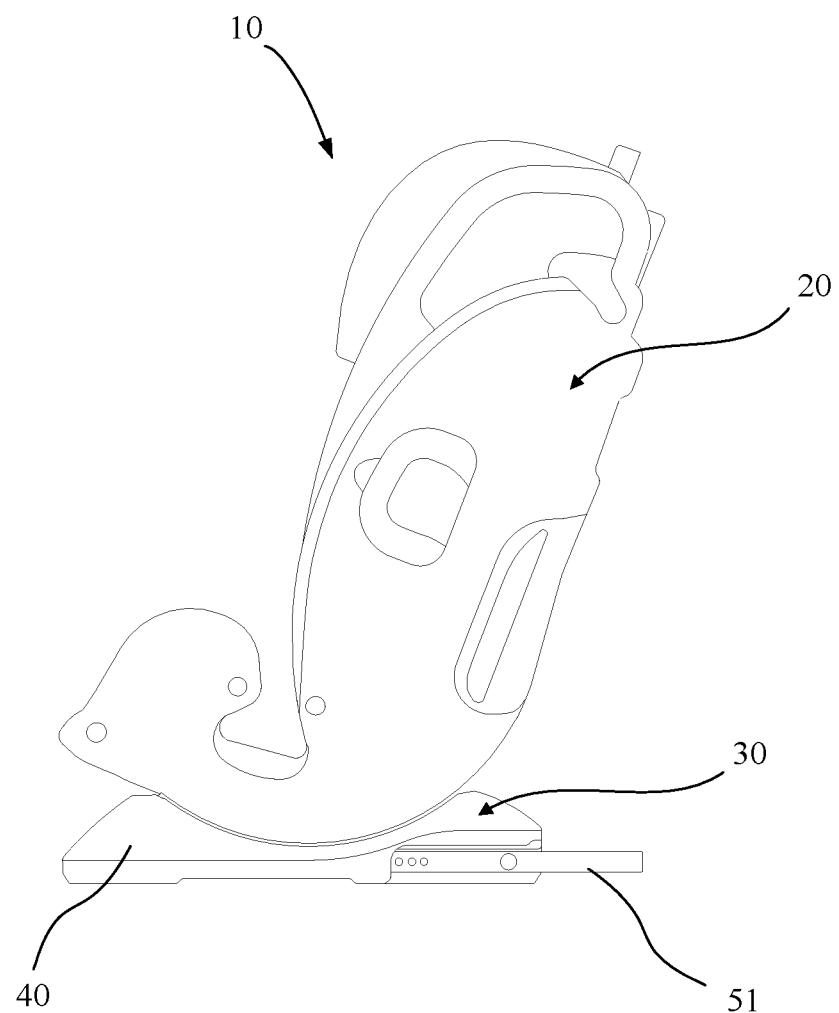
FIG. 2 is a side view of the safety seat in FIG. 1 in another state.
Figure 3:
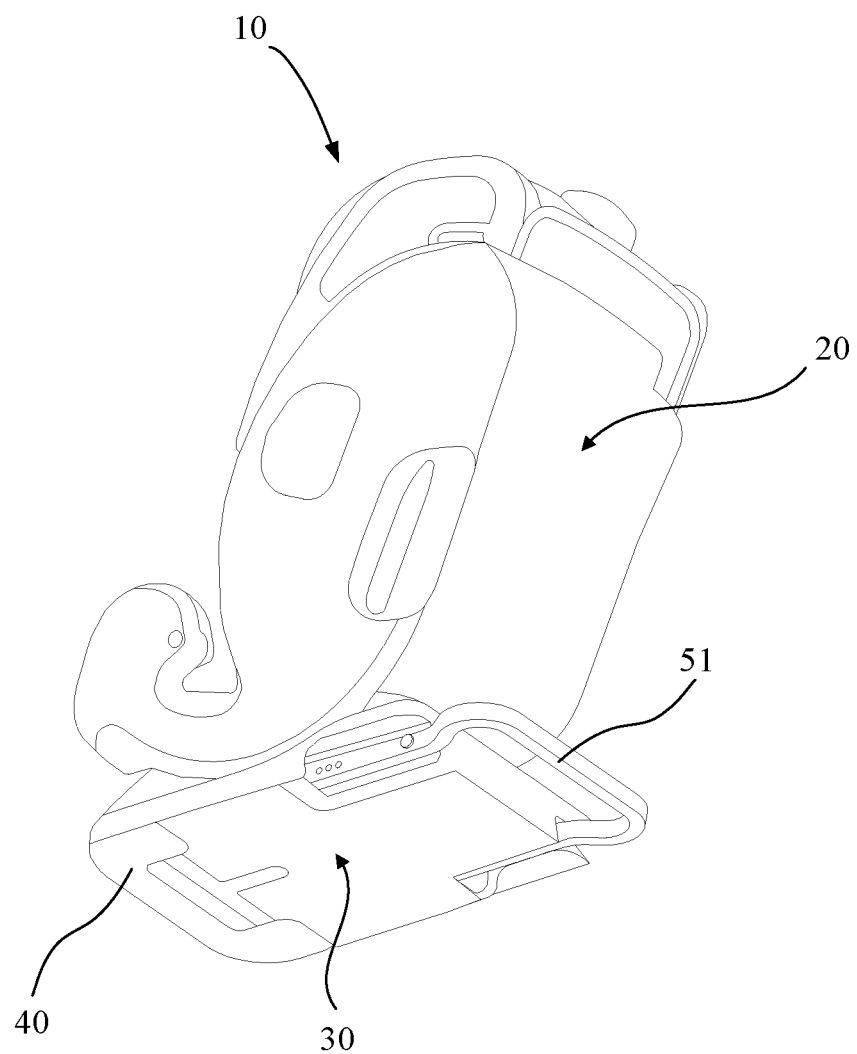
FIG. 3 is a perspective view of the safety seat in FIG. 1.

According to an embodiment of the present disclosure, the seat body 20 is configured such that an inclination angle thereof with respect to the base 30 is adjustable. When the inclination angle of the seat body 20 is adjusted, the position of the base body 40 on the vehicle seat needs to be adjusted correspondingly. Accordingly, the relative position of the support member 51 with respect to the base body 40 can be adjusted simultaneously, i.e., the length of the support member 51 that extends out of the base body 40 can be adjusted so that the support member 51 can keep abutting against the seat backrest, thereby supporting and securing the safety seat 10 on the vehicle seat in a stable manner. FIGS. 1 and 2 show the support member 51 in a first position and in a second position, respectively. In the second position, the support member 51 extends a relatively longer length out of the base body 40.

It should be noted that the above or following description as to the support member being configured to abut against the backrest of the vehicle seat back does not mean that the support member, in normal, is necessarily in contact with backrest of the vehicle seat. Rather, it includes the situation in which the two are separated by a small distance and abutment may occur only under certain circumstances. For example, when the safety seat moves a small distance, the support member abuts against the backrest of the vehicle seat to limit the movement of the safety seat.

Figure 4:
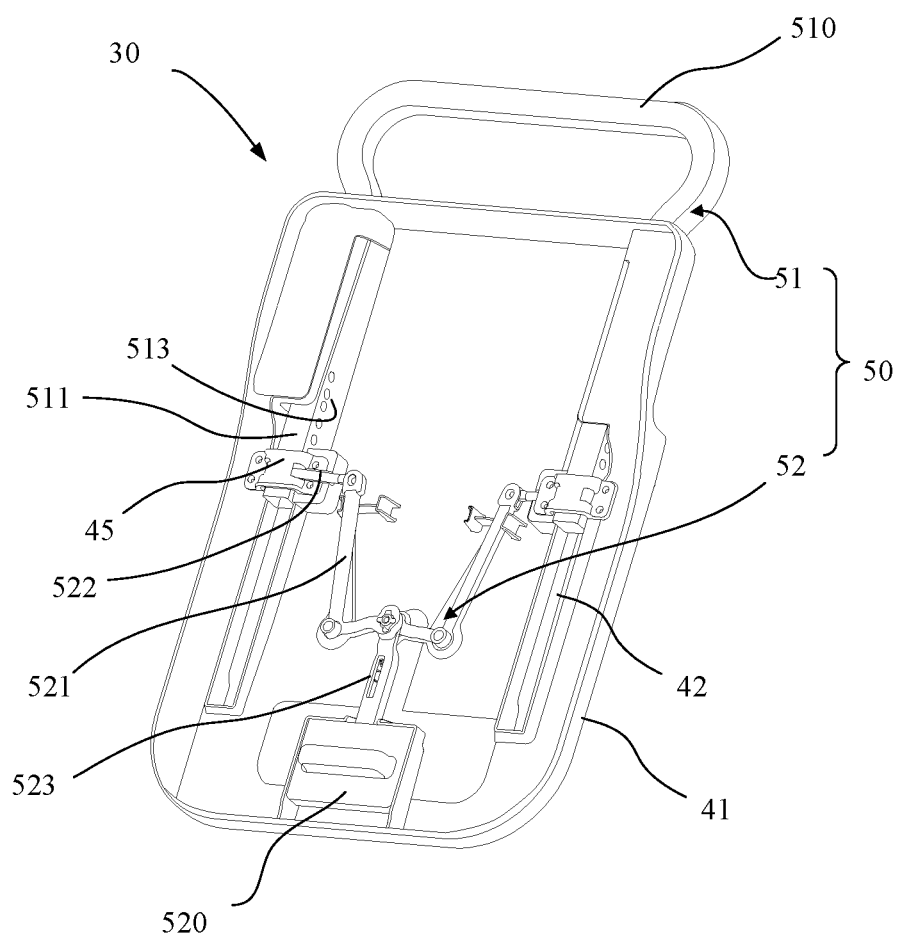
FIG. 4 is a perspective view of a base of the safety seat of an embodiment of the present disclosure.
Figure 5:
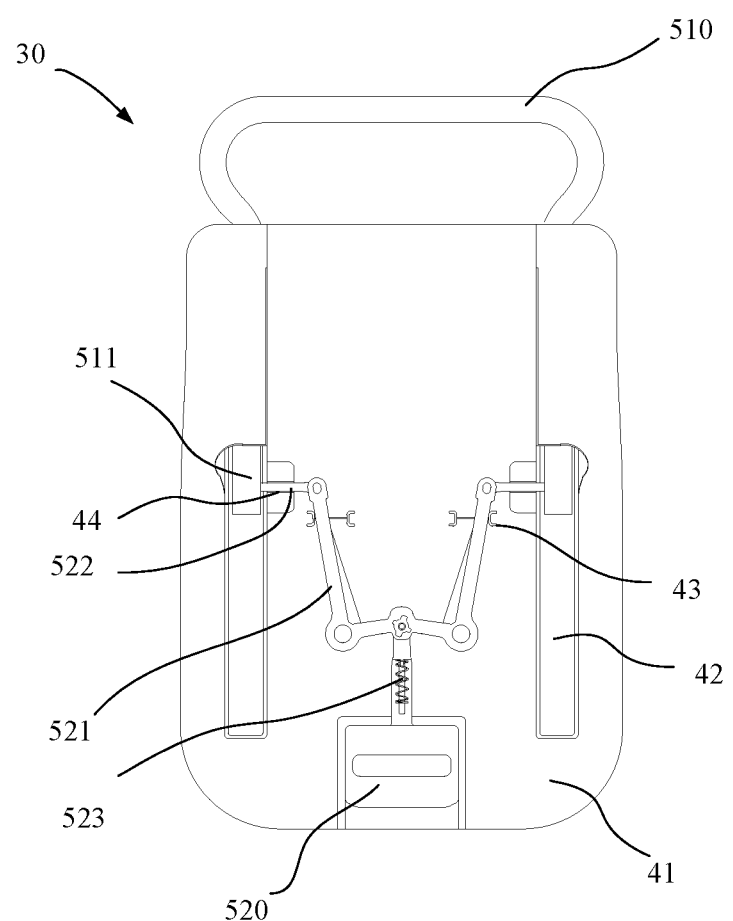
FIG. 5 is a front schematic view of the base in FIG. 4.
Figure 6:
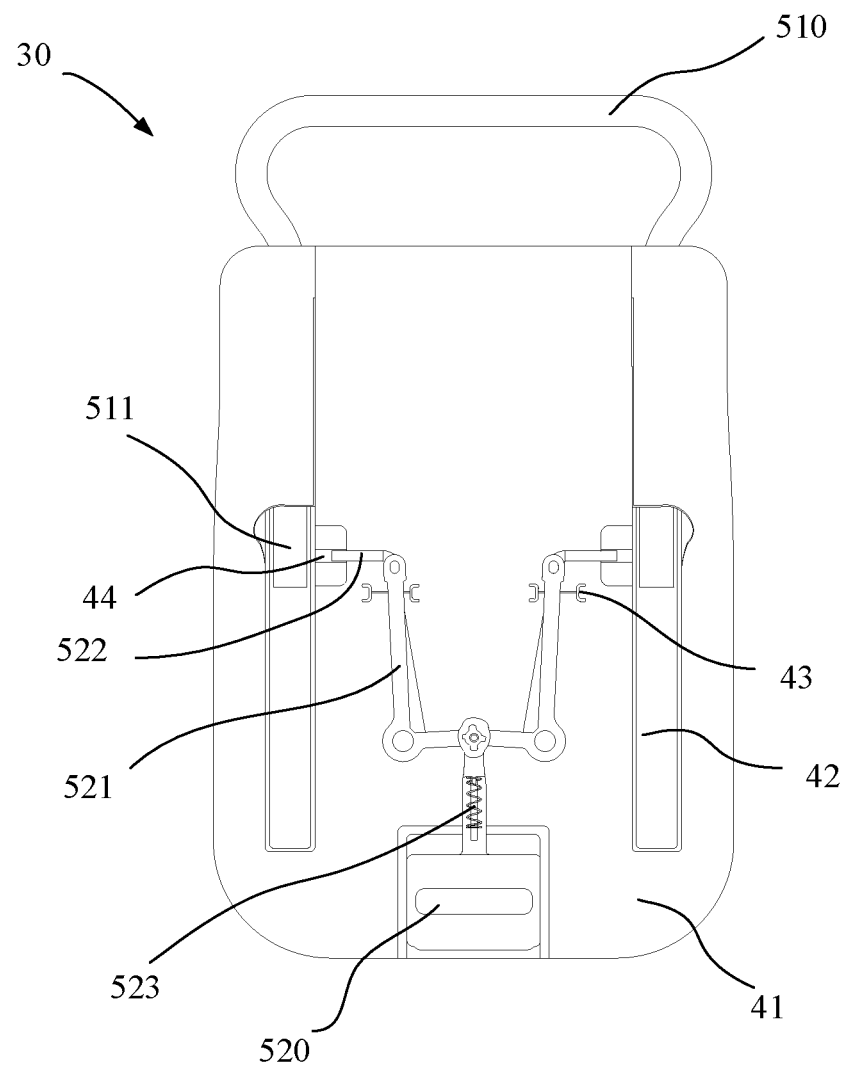
FIG. 6 is a front schematic view of the base in FIG. 4 in another state.

Referring to FIGS. 4-6, the base body 40 includes an upper housing and a lower housing 41 which are assembled together (to show out the structure of the support mechanism 50, the upper housing is omitted in FIGS. 4-6). It should be understood that in other embodiments, the base body 40 may be of a one-piece structure.

Figure 7:
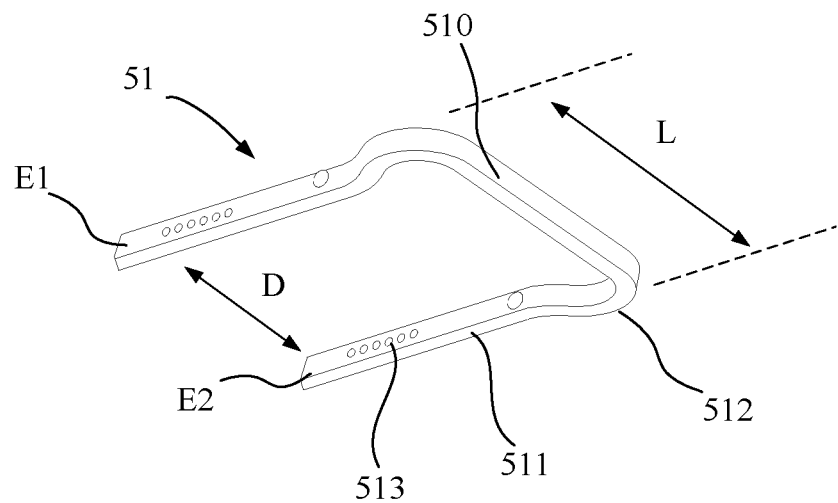
FIG. 7 a perspective view of a support member of the safety seat of an embodiment of the present disclosure.
Figure 8:
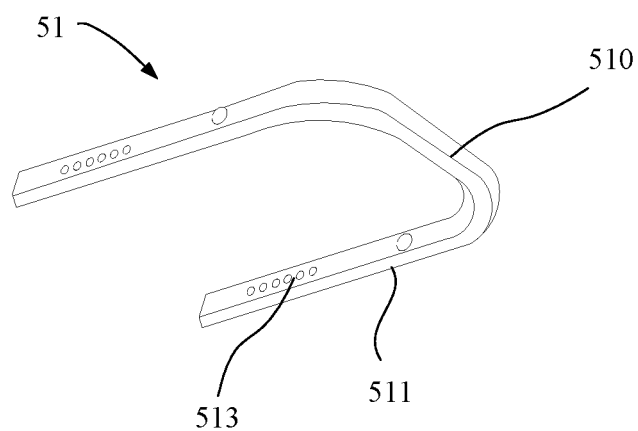
FIG. 8 a perspective view of a support member of the safety seat of another embodiment of the present disclosure.

Referring to FIG. 7, the support member 51 has a tubular and rod-shaped structure, and includes a support portion 510 and two connecting portions 511 respectively located on opposite sides of the support portion 510 and connected to the same. The support portion 510 is configured to abut against the backrest of the vehicle seat. In some embodiments, the support portion 510 together with the connecting portions 511 may be supported on a seat surface of the vehicle seat. Further, a bending portion 512 may be provided between the connecting portion 511 and the support portion 510, and configured such that the length L of the support portion 510 is greater than the distance D between the ends E1, E2 of the connecting portion 511. A longer support portion 510 provides a better support. Understandably, in the embodiment as shown in FIG. 8, the connecting portions 511 may extend directly from the support portion 510 without a bending portion, and in this case, the length of the support portion 510 is equal to the distance between the two connecting portions 511. The connecting portions 511 are provided with a plurality of positioning holes 513 arranged along a front-back direction of the safety seat 10, respectively, and the positioning holes 513 cooperate with the adjustment assembly 52 to adjust and secure the position of the support member 51 with respect to the base body 40. The larger the number of positioning holes 513 is and the closer they are arranged, the greater the range of adjustment of the support member 51 is and the higher the accuracy of adjustment is.

In other embodiments, each connecting portion 511 may be connected to a separate support portion, i.e., each side of the base 30 is provided with one support member, so that the two support members can be adjusted independently of each other.

Continuing to refer to FIGS. 4-6, the connecting portions 511 of the support member 51 are inserted into the base body 40. Corresponding to the connection part 511, the base body 40 is provided with guide rails 42 on both sides. In an embodiment, the guide rails 42 are provided on both sides of the lower housing 41. The connecting portions 511 are accommodated and slide in the guide rails 42 during the adjustment of the support member 51, respectively.

Referring to FIGS. 4-6, the adjustment assembly 52 includes an operative member 520, a drive member 521 connected to the operative member 520, and at least one securing member 522 connected to the drive member 521.

The securing member 522 has a rod-shaped structure. In the embodiment shown in FIGS. 4-6, the adjustment assembly 52 has a pair of securing members 522 disposed on two sides of the drive member 521 respectively. It should be understood that in other embodiments, the adjustment assembly may include one or more than two securing members. The securing members 522 may be inserted into the positioning holes 513 of the support member 51 to secure the position of the support member 51 with respect to the base body 40. The drive member 521 and the operative member 520 are located in the same operating plane (not labeled). When the operative member 520 is moved from a first position to a second position along the operating plane, it drives the drive member 521 to rotate in a clockwise or counterclockwise direction and disengages the securing members 522 from the positioning holes 513, and when the operative member 520 is moved from the second position to the first position, it drives the drive member 521 to rotate reversely in the opposite direction and inserts the securing members 522 into the positioning holes 513. In this embodiment, the operative member 520 is moved along a front-back direction of the operating plane between the first position and the second position. According to the structure shown in the illustrated embodiment, one end of the drive member 521 is pivotally connected to the operative member 520 and the other end of the drive member 521 is pivotally connected to the securing members 522. The drive member 521 is pivotally provided on the base body 40 by being pivoted to the lower housing 41 through a pivot point. The pivot point thus divides the drive member 521 into two segments that are connected to the operative member 520 and the securing member 522, respectively, thereby enabling the operative member 520 to control the reciprocal movement of the securing members 522 by means of leverage. The operative member 520 shown in FIG. 5 is located at the first position where the securing members 522 are inserted in the positioning holes 513 and the position of the support member 51 is secured at this moment. The operative member 520 shown in FIG. 6 is at the second position where the securing members 522 are disengaged from the positioning holes 513, and at this moment, the support member 51 can be freely adjusted to desired positions. When the operative member 520 is moved, for example, by the user's operation, from the first position to the second position along the front-back direction of the operating plane, the operative member 520 rotates the drive member 521 and disengages the securing members 522 from the positioning holes 513. When the operative member 520 is moved from the second position to the first position, the drive member 521 rotates reversely in the opposite direction, which inserts the securing members 522 into the positioning holes 513.

The adjustment assembly 52 may also include a resilient member, such as a spring 523. The spring 523 abuts against the operative member 520 to provide a resilient force to the operative member 520. When the operative member 520 is released from the second position, the spring 523 may restore the operative member 520 to the first position. In addition, a limiting member 43 is provided on the base body 40 to limit the rotation amount of the drive member 521. In an embodiment, the limiting member 43 is provided on the lower housing 41. The drive member 521, when rotates, will interfere with the limiting member 43 to limit the rotation amount.

The base body 40 is provided with positioning slots 44 through which the securing members 522 pass. The securing member 522 are slidable within the positioning slot 44 in a transverse direction, but immovable in the front-back direction as being restricting by the positioning slot 44. In an embodiment, the positioning slot 44 is provided on the lower housing 41. In addition, in order to further stabilize the connecting portions 511 of the support member 51 in the guide rails 42 and prevent the connecting portion 511 from detaching from the guide rail 42, the base body 40 further includes stoppers 45 mounted above the guide rails 42 to restrict the connecting portions 511 of the support member 51. In an embodiment, the stoppers 45 can be fixed above the guide rail 42 by screws.

Figure 9:
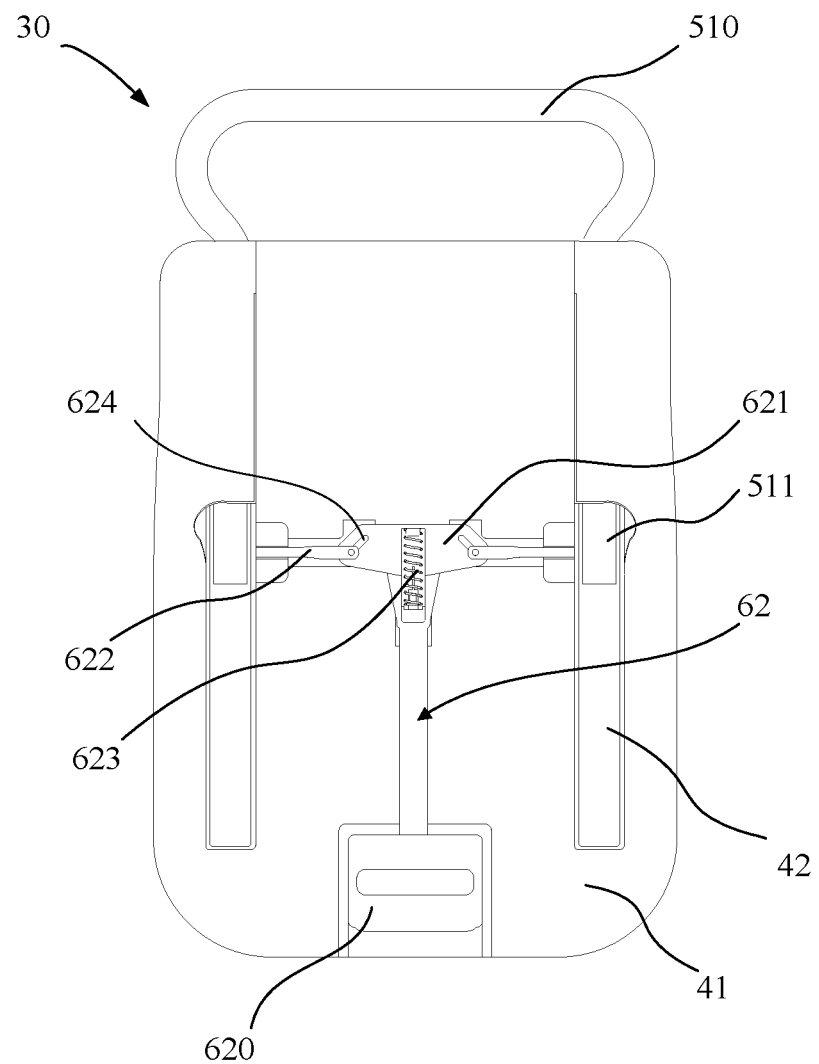
FIG. 9 a front schematic view of a base of the safety seat of another embodiment of the present disclosure.
Figure 10:
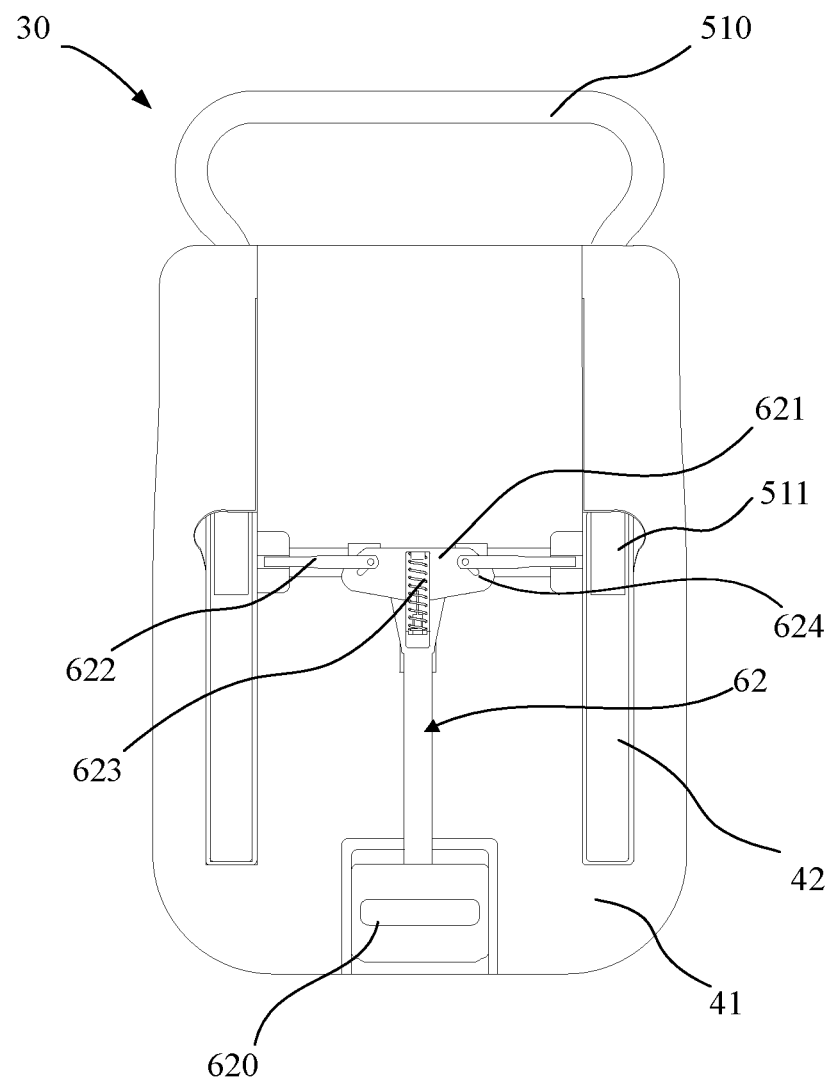
FIG. 10 is a front schematic view of the base in FIG. 9 in another state.

FIGS. 9-10 show another embodiment of the present disclosure, which has a different structure of adjustment assembly than the embodiment shown in FIGS. 4-6. Specifically, the adjustment assembly 62 includes an operative member 620, a drive member 621 connected to the operative member 620, and securing members 622 connected to the drive member 621. The operative member 620 shown in FIG. 9 is in a first position where the securing members 622 is inserted in the positioning holes 513 so that the position of the support member 51 is secured. The operative member 620 shown in FIG. 10 is in a second position where the securing members 622 are disengaged from the positioning holes 513, and thus the support member 51 can be freely adjusted to desired positions at this moment. The drive member 621 is provided with guide slots 624, and one end of the securing member 622 is movably constrained in the guide slot 624. The guide slot 624 is configured to disengage the securing member 622 from the positioning hole 513 when the operative member 620 is moved from the first position to the second position along the front-back direction of the safety seat 10, and insert the securing member 622 into the positioning hole 513 when the operative member 620 is moved from the second position to the first position along the front-back direction of the safety seat 10. In a more specific embodiment, an angle of inclination between the extension direction of the guide slot 624 and the front-back direction of the safety seat 10 is provided, which converts the movement of the operation member 620 in the front-back direction to the movement of the securing member 622 in the transverse direction perpendicular to the front-back direction.

The adjustment assembly 62 may include a resilient member, such as a spring 623, which abuts against the drive member 621 to provide a resilient force to the drive member 621 and the operative member 620. The spring 623 may restore the operative member 620 to the first position when the operative member 620 is released from the second position.

In the two embodiments of the adjustment assemblies 52, 62 described above, the operative members 520, 620 are located at the front of the base body 40 and are exposed outside of the base body 40 so that the user can easily and directly operate the operative members 520, 620 to adjust the support member 51 without having to remove the safety seat 10 from the vehicle seat.

In the above described embodiment, the support member 51 can be manually operated by the user to adjust the length of the support member 51 extending out of the base body 40 when the adjustment assembly 52, 62 unlocks it. In addition, in a modified embodiment, the support mechanism 50 further includes a resilient assembly (not shown) that cooperates with the support member 51 to provide a continuous resilient thrust to the support member 51 such that the support member 51 can extend out of the base body 40 automatically to a desired position when it is unlocked. For example, when the safety seat 10 is moved forward on the vehicle, which thus requires elongation of the support member 51, the support member 51, if unlocked, extends backward automatically until it abuts against the backrest of the vehicle seat.

Figure 11:
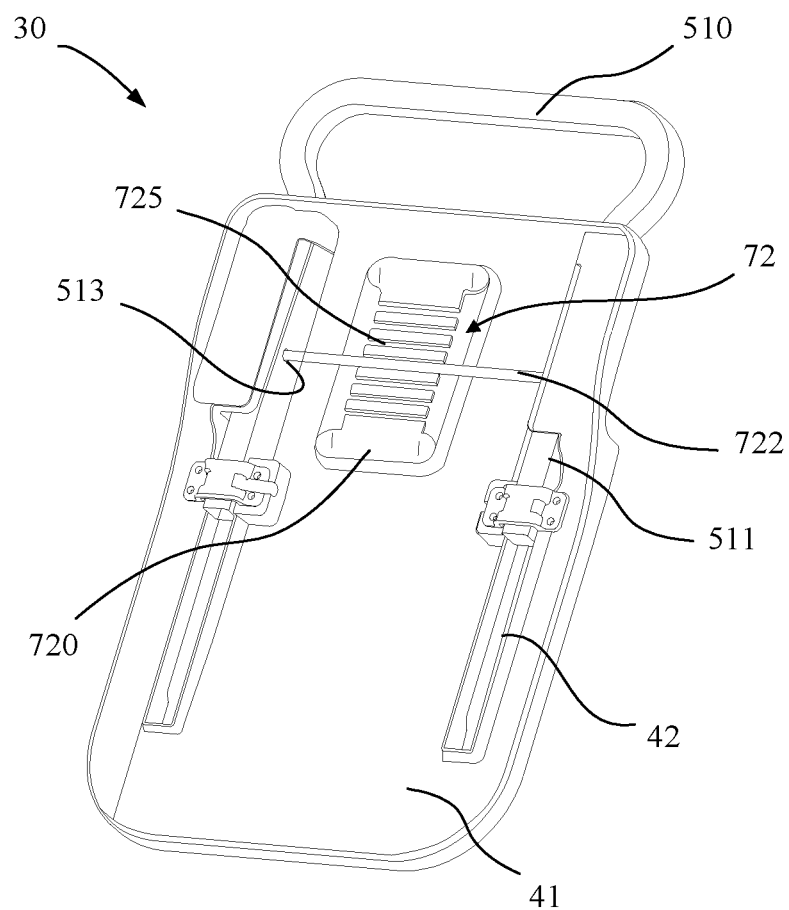
FIG. 11 a perspective view of a base of the safety seat of another embodiment of the present disclosure.
Figure 12:
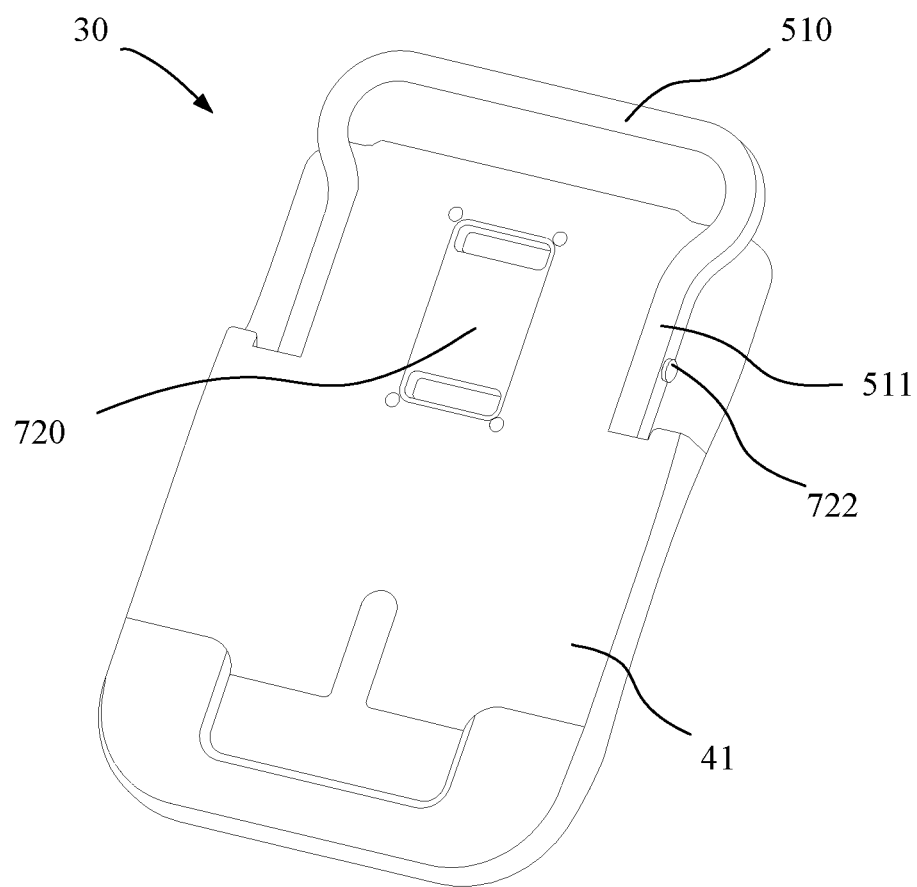
FIG. 12 is a perspective view of the base in FIG. 11 from another angle.
Figure 13:
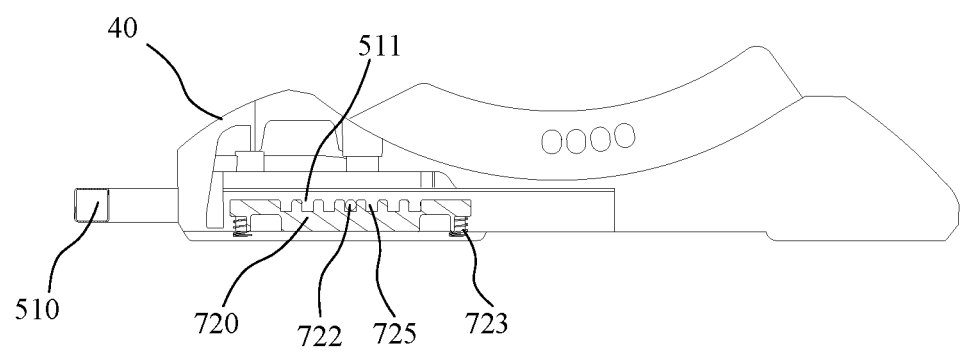
FIG. 13 is a schematic cross-sectional view of the base in FIG. 11.

FIGS. 11-13 show another embodiment of the present disclosure, in which an adjustment assembly 72 includes an operative member 720 and a securing member 722. The securing member 722 is fixed to the support member 51. The operative member 720 is provided with a plurality of positioning grooves 725 arranged along the front-back direction of the safety seat 10. The larger the number of positioning grooves 725 is and the closer they are arranged, the greater the range of adjustment of the support member 51 is and the higher the accuracy of adjustment is. The operative member 720 is configured to move between a first position and a second position in a height direction of the safety seat 10. FIG. 13 shows the operative member 720 in a first position where the securing member 722 is inserted in the positioning groove 725 to secure the position of the support member 51. When the operative member 720 is in the second position, the securing member 722 is disengaged from the positioning groove 725 and the support member 51 can be freely adjusted to desired positions at this moment. For example, when the operative member 720 is pulled downward by the user to move from the first position to the second position, the positioning groove 725 of the operative member 720 releases the securing member 722, i.e., releases the support member 51, and the support member 51 can be freely adjusted at this moment.

The adjustment assembly 72 may also include a resilient member, such as a spring 723 that abuts against the operative member 720 to provide a resilient force to the operative member 720. The spring 723 may drive the operative member 720 to move back to the first position when the operative member 720 is released from the second position.

In contrast to the embodiments described previously, in the embodiment shown in FIGS. 11-13, only a single positioning hole 513 for each connecting portion is provided to secure the securing member 722 to the support member 51.

In other embodiments, the adjustment assembly may include a linear actuator (not shown) that drives the support member 51. For example, the linear actuator may include an air cylinder, a hydraulic cylinder, or a ball screw, etc. The linear actuator may actuate the support member 51 based on operating instructions. For example, the actuator directly actuates the connecting portions 511 of the support member 51 to move in a front-back direction to achieve position adjustment of the support member 51 with respect to the base body 40, thereby ensuring that the support member 51 abuts against the backrest of vehicle seat, in the event that the position of the safety seat 10 needs to be adjusted to ensure stability of the safety seat 10. The linear actuator may further lock the support member 51 in the adjusted position. Compared with the previous embodiment, the use of an actuator eliminates the need for manual pushing and pulling of the support member, or provides a more effortless means of operation, thereby facilitating the user's operation.

It will be understood by those skilled in the art that in addition to the various structural forms of the adjustment assembly described above, other adjustment assemblies of the prior art may be used, provided that the adjustment assembly is capable of adjusting or locking the position of the support member in the front-back direction. The specific structure and mechanism of these other adjustment components are known to those skilled in the art, so they are not described in detail here.

According to the safety seat and the base of the safety seat provided by various embodiments of the present disclosure, when the position of the safety seat on the vehicle seat needs to be adjusted, for example, when the base of the safety seat needs to be moved forward away from the backrest of the vehicle seat, the length of the support member of the support mechanism extending out of the base body can be increased to ensure that the support member keeps abutting against or close to the backrest of the vehicle seat, so that the safety seat can be better stabilized on the vehicle seat. When the seat base needs to be moved back closer to the backrest of the vehicle seat, it is only necessary to shorten the length of the support member extending out of the seat body. In another situation, when the seat belt is loosened due to a child's action, the support member can be adjusted to keep abutting against the backrest of vehicle seat and keep the seat belt in a tight state, so as to ensure the safety of children in the vehicle.

The technical features of the above described embodiments can be combined in any way according to the actual situations. For simplification purpose, not all possible combinations of the technical features in the above described embodiments are described. however, as long as there is no contradiction in the combination of these technical features, they should be considered to fall with the scope of the present disclosure.

Only several embodiments of the present disclosure are described with more specific and detailed descriptions, but they are not intended to be a limitation of the scope of the patent invention. It should be noted that for a person of ordinary skill in the art, a number of modifications and improvements can be made without departing from the conception of the present invention, which all belong to the patent scope of the present invention. Therefore, the patent scope of the present invention shall be subject to the attached claims.

What is claimed is:

1. A base for a safety seat, comprising:
   a base body; and
   a support mechanism mounted with the base body for supporting the safety seat on a vehicle seat, the support mechanism comprising:
      a support member extending out of the base body and movable back and forth with respect to the base body; and
      an adjustment assembly configured to adjust a position of the support member with respect to the base body,
      wherein the adjustment assembly comprises a drive member, an operative member exposed outside of the base body, and a resilient member configured to restore the operative member, and
      wherein the base body is provided with a limiting member configured to limit a rotation amount of the drive member.

2. The base of claim 1, wherein the support member comprises a support portion configured to abut against a backrest of the vehicle seat and a connecting portion connected to the support portion.

3. The base of claim 2, wherein the connecting portion comprises a plurality of positioning holes, and the adjustment assembly further comprises at least one securing member, the at least one securing member being inserted into the positioning hole to secure the support member in a position with respect to the base body.

4. The base of claim 3, wherein the drive member being rotatably provided on the base body, the drive member and the operative member being located in an operating plane, one end of the drive member being rotatably connected to the operative member and the other end of the drive member being connected to the securing member, wherein the drive member is driven to rotate in a clockwise or counterclockwise direction so as to disengage the securing member from the positioning hole when the operative member is moved from a first position to a second position along the operating plane, and the drive member is driven to rotate reversely so as to insert the securing member into the positioning hole when the operative member is moved from the second position to the first position.

5. The base of claim 4, wherein the base body is provided with a positioning slot, and the securing member slides within the positioning slot.

6. The base of claim 3, wherein the adjustment assembly comprises an operative member and a drive member connected to the operative member, the drive member having a guide slot, one end of the securing member being constrained in the guide slot, the guide slot being configured such that the operative member disengages the securing member from the positioning hole when the operative member is moved from a first position to a second position along a front-back direction of the safety seat, and inserts the securing member into the positioning hole when the operative member is moved from the second position to the first position.

7. The base of claim 2, wherein the adjustment assembly comprises an operative member and a securing member, the securing member being fixed to the connecting portion, the operative member being provided with a plurality of positioning grooves, the operative member being configured to be movable between a first position and a second position in a height direction of the safety seat, the securing member being put into the positioning groove when the operation member is located in the first position, and disengaged form the positioning groove when the operative member is located in the second position.

8. The base of claim 1, wherein the adjustment assembly further comprises a linear actuator that drives a movement of the support member.

9. The base of claim 1, wherein the support mechanism further comprises a resilient assembly that provides a continuous resilient thrust to the support member.

10. The base of claim 2, wherein the support portion extends in a transverse direction perpendicular to a front-back direction of the safety seat, and the connecting portion extending at opposite sides of the support portion along the front-back direction of the safety seat.

11. The base of claim 10, wherein the support member comprises a bending portion between the connecting portion and the support portion, and the support portion has a length greater than a distance between two ends of the connecting portion.

12. A safety seat, comprising a base and a seat body supported on the base, the base comprising:
a base body; and
a support mechanism mounted with the base body for supporting the safety seat on a vehicle seat, the support mechanism comprising:
a support member extending out of the base body and movable back and forth with respect to the base body; and
an adjustment assembly configured to adjust a position of the support member with respect to the base body;
wherein the adjustment assembly comprises a drive member, an operative member exposed outside of the base body, and a resilient member configured to restore the operative member, and
wherein the base body is provided with a limiting member configured to limit a rotation amount of the drive member.

13. The safety seat of claim 12, wherein the seat body is configured such that an inclination angle of the seat body with respect to the base is adjustable.

14. The safety seat of claim 12, wherein the support member comprises a support portion configured to abut against a backrest of the vehicle seat and a connecting portion connected to the support portion.

15. The safety seat of claim 14, wherein the connecting portion comprises a plurality of positioning holes, and the adjustment assembly comprises at least one securing member, the at least one securing member being inserted into the positioning hole to secure the support member in a position with respect to the base body.

16. The safety seat of claim 15, wherein the adjustment assembly further comprises a drive member and an operative member, the drive member being rotatably provided on the base body, the drive member and the operative member being located in an operating plane, one end of the drive member being rotatably connected to the operative member and the other end of the drive member being connected to the securing member, wherein the drive member is driven to rotate in a clockwise or counterclockwise direction so as to disengage the securing member from the positioning hole when the operative member is moved from a first position to a second position along the operating plane, and driven to rotate reversely so as to insert the securing member into the positioning hole when the operative member is moved from the second position to the first position.

17. The base of claim 15, wherein the adjustment assembly comprises an operative member and a drive member connected to the operative member, the drive member having a guide slot, one end of the securing member being constrained in the guide slot, the guide slot being configured such that the operative member disengages the securing member from the positioning hole when the operative member is moved from a first position to a second position along a front-back direction of the safety seat, and inserts the securing member into the positioning hole when the operative member is moved from the second position to the first position.

18. The safety seat of claim 14, wherein the adjustment assembly comprises an operative member and a securing member, the securing member being fixed to the connecting portion, the operative member being provided with a plurality of positioning grooves, the operative member being configured to be movable between a first position and a second position in a height direction of the safety seat, the securing member being put into the positioning groove when the operation member is located in the first position, and disengaged form the positioning groove when the operative member is located in the second position.

* * * * *